United States Patent Office 2,820,797
Patented Jan. 21, 1958

2,820,797

ADDITION COMPOUND OF NITROPHENYL PHTHALIMIDOPROPANOLAL AND PHTHALIMIDOACETALDEHYDE AND PREPARATION THEREOF

Robert Michel Jacob, Ablon-sur-Seine, and Jacques Georges Robert, Paris, France, assignors, by mesne assignments, to Parke, Davis & Company, Detroit, Mich., a corporation of Michigan No Drawing. Application April 7, 1952
Serial No. 281,033

Claims priority, application France April 13, 1951

The portion of the term of the patent subsequent to February 17, 1970, has been disclaimed and dedicated to the public 5 Claims. (Cl. 260—326)

This invention relates to the preparation of an erythro propane diol and to intermediates for use in such preparation.

In the specification of our co-pending application Serial No. 2,124,483 filed February 23, 1951, now Patent 2,628,975, issued February 17, 1953, of which the present application is a continuation-in-part, we have described the preparation of erythro 2-o-carboxybenzamido-1-p-nitrophenylpropane 1:3-diol by a process which comprises condensing p-nitrobenzaldehyde with α-phthalimidoacetaldehyde in the presence of a basic condensing agent, reducing the condensation product and hydrolysing the product of reduction under alkaline conditions, the said condensation being preferably effected in the presence of a basic condensing agent such as triethylamine.

The aforesaid condensation step, when carried out in the manner above described, may require several days for completion which is a substantial drawback to commercial scale production. It is the object of the present invention to provide a method for very substantially reducing the time required for bringing about the condensation reaction.

According to the present invention, therefore, a modification of or improvement in the process of the aforesaid parent application consists in effecting the step of condensing p-nitrobenzaldehyde with α-phthalimidoacetaldehyde in the presence of a caustic alkali such as caustic soda, caustic potash or lithium hydroxide.

According to a preferred feature of this invention, the caustic alkali is added to a mixture of the two reactants previously dissolved in a suitable organic solvent such as dioxane at a temperature not greater than room temperature, and preferably between 0° and 10° C. The quantity of alkali added should be sufficient to start the reaction but an excess of alkali should be avoided in order to prevent partial hydrolysis of the phthalimido group which would complicate separation of the condensation product and its subsequent reduction. It is, however, a simple matter to determine the quantity of alkali required: thus, the caustic alkali in the form of an aqueous solution is added, with continual stirring, little by little to the reaction mixture, the temperature of the reaction mixture being taken at intervals and the addition of alkali being stopped when said temperature has risen several degrees. For convenience, an aqueous caustic alkali solution of about 2 to about 10 N is employed. After the commencement of the reaction, the temperature may spontaneously increase to 20–25° C. and the condensation is complete after a period of several hours at a temperature of between 0° and 25° C.

The present invention is illustrated by the following examples:

Example I 56.7 g. of α-phthalimidoacetaldehyde and 22.7 g. of p-nitrobenzaldehyde are dissolved in 150 cc. of dioxane. The solution is cooled to about 0° C. to cause partial solidification of the dioxane. 3.5 cc. of a 4 N solution of caustic soda is added with stirring. The temperature rises quickly to 8° C. Next the solution is allowed to crystallise for 2 hours while cooling to about 0 to 5° C. and is liquefied by addition of cooled methanol, filtered, washed with methanol and dried. There is thus obtained 54.6 g. of an addition compound of 1-(p-nitrophenyl)-1-hydroxy-2-phthalimido-3-propanal and α-phthalimidoacetaldehyde. This product decomposes on the Maquenne block at about 190° C. and its reduction by sodium borohydride followed by treatment with alkali leads to 1-(p-nitrophenyl)-2(2'-carboxybenzoyl)amino-1:3-propane diol as described in the parent application, now Patent 2,628,975.

Example II 5.67 g. of α-phthalimidoacetaldehyde, and 2.27 g. of p-nitrobenzaldehyde are dissolved in 15 cc. of dioxane. Four drops of 4 N solution of lithium hydroxide are added to this solution cooled to about 10° C. The temperature rises to 24° C. The mixture is left for two hours in a bath of iced water, liquefied with methanol, filtered, washed with methanol and dried. 5.27 g. of an addition compound analogous to that obtained in Example I is obtained.

Example III

Operating as in Example II but with eight drops of a 3.2 N solution of potassium hydroxide, 2.63 g. of an addition compound, analogous to that obtained in Example I is produced.

Example IV

Operating as in Example II but with four drops of a 10 N solution of caustic soda 4.18 g. of a product, analogous to that obtained in Example I is produced.

The process of the present invention has the advantage of reducing to a period of merely a few hours the condensation step of the process of the parent application and therefore is of considerable commercial importance.

We claim:

1. Process for obtaining an addition product of the aldol

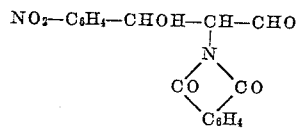

with α - phthalimidoacetaldehyde which comprises condensing p-nitrobenzaldehyde with α-phthalimidoacetaldehyde in the presence of caustic alkali and the temperature during the condensation is maintained not substantially above room temperature.

2. Process according to claim 1 in which the reaction is carried out in an organic solvent.

3. A composition consisting of an addition product with α-phthalimidoacetaldehyde of the aldol having the formula

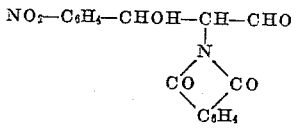

4. Process which comprises mixing p-nitrobenzaldehyde and α-phthalimidoacetaldehyde below room temperature in an organic solvent in the presence of an amount of aqueous caustic alkali sufficient to cause reaction but insufficient to raise the reaction temperature above room temperature thereby forming an addition product with α-phthalimidoacetaldehyde of the aldol

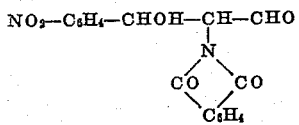

5. Process which comprises mixing p-nitro-benzaldehyde with α-phthalimidoacetaldehyde in dioxane, cooling to a temperature between 0 and 10° C., slowly adding caustic alkali while maintaining the temperature at a point not substantially above room temperature thereby obtaining within a few hours a substantially complete condensation forming an addition product with α-phthalimidoacetaldehyde of the aldol

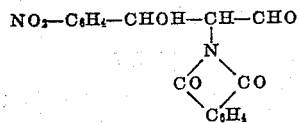

References Cited in the file of this patent

UNITED STATES PATENTS 2,628,975    Jacob _____ Feb. 17, 1953
2,677,704    Jacob _____ May 4, 1954

OTHER REFERENCES

Karrer: "Organic Chemistry" (1938), published by Elsevier, New York, p. 144.

Richters: "Organic Chemistry," vol. III, published by Elsevier, New York (1946), page 276.